United States Patent
Viaux

(10) Patent No.: US 10,946,903 B2
(45) Date of Patent: Mar. 16, 2021

(54) VEHICLE UNDERBODY STRUCTURE COMPRISING A TRANSVERSAL BEAM OF VARYING RESISTANCE TO PLASTIC DEFORMATION

(71) Applicant: ArcelorMittal, Luxembourg (LU)

(72) Inventor: Ivan Viaux, Paris (FR)

(73) Assignee: ARCELORMITTAL, Luxembourg (LU)

( * ) Notice: Subject to any disclaimer, the term of this patent is extended or adjusted under 35 U.S.C. 154(b) by 257 days.

(21) Appl. No.: 15/780,824

(22) PCT Filed: Dec. 9, 2016

(86) PCT No.: PCT/EP2016/002079
§ 371 (c)(1),
(2) Date: Jun. 1, 2018

(87) PCT Pub. No.: WO2017/097427
PCT Pub. Date: Jun. 15, 2017

(65) Prior Publication Data
US 2020/0262490 A1    Aug. 20, 2020

(30) Foreign Application Priority Data
Dec. 9, 2015   (WO) .................. PCT/IB2015/059485

(51) Int. Cl.
*B62D 25/20* (2006.01)
*B62D 21/03* (2006.01)
(Continued)

(52) U.S. Cl.
CPC ............. *B62D 25/20* (2013.01); *B62D 21/03* (2013.01); *B62D 25/025* (2013.01); *B62D 29/007* (2013.01); *B62D 21/157* (2013.01)

(58) Field of Classification Search
CPC .. B62D 25/20; B62D 25/2036; B62D 25/025; B62D 29/007
(Continued)

(56) References Cited

U.S. PATENT DOCUMENTS 7,500,714 B2 *   3/2009   Abe .................... B62D 21/157
                                                              296/187.09
9,896,131 B2 *   2/2018   Onishi ................ B62D 21/157
(Continued)

FOREIGN PATENT DOCUMENTS

CN       101674958 A    3/2010
CN       104908818 A    9/2015
(Continued)

OTHER PUBLICATIONS

The International Search Report issued in connection with International Application No. PCT/EP2016/002079 dated Apr. 10, 2017.
(Continued)

*Primary Examiner* — Jason S Morrow
(74) *Attorney, Agent, or Firm* — Davidson, Davidson & Kappel, LLC

(57) ABSTRACT

The vehicle underbody structure comprises a floor panel, at least one longitudinal beam extending in a longitudinal direction of the vehicle under said floor panel and at least one transversal beam extending in a transversal direction, substantially perpendicular to the longitudinal direction, above the floor panel, the floor panel extending transversally between two sides, the transversal beam comprising a transversal central end extending under a central area of said floor panel and a transversal side end extending at one of the sides of said floor panel, wherein the transversal beam comprising a central portion, extending between the central end and an intermediate part of the transversal beam, and an end portion, extending between the intermediate part and the side
(Continued)

end, the resistance to plastic deformation of the central portion being greater than the resistance to plastic deformation of the end portion, and in that the intermediate part of the transversal beam extends upright of the longitudinal beam such that the end portion of the transversal beam extends transversally between the longitudinal beam and one of the sides of the floor panel.

11 Claims, 2 Drawing Sheets

(51) Int. Cl.
  *B62D 25/02* (2006.01)
  *B62D 29/00* (2006.01)
  *B62D 21/15* (2006.01)
(58) Field of Classification Search
  USPC .............................. 296/187.08, 193.07, 209
  See application file for complete search history.

(56) References Cited

U.S. PATENT DOCUMENTS

| | | |
|---|---|---|
| 2008/0315630 A1 | 12/2008 | Klimek |
| 2010/0194126 A1 | 8/2010 | De Queiroz et al. |
| 2011/0272969 A1 | 11/2011 | Mori |
| 2013/0049408 A1* | 2/2013 | Kurogi .................. B62D 25/025 296/209 |
| 2013/0214558 A1 | 8/2013 | Lohmann et al. |
| 2013/0229030 A1 | 9/2013 | Yamaguchi et al. |
| 2014/0306485 A1 | 10/2014 | Bechtler et al. |
| 2014/0367002 A1 | 12/2014 | Naitou et al. |
| 2015/0004433 A1 | 1/2015 | Tanaka et al. |
| 2015/0258956 A1 | 9/2015 | Sassi et al. |
| 2017/0334487 A1* | 11/2017 | Fritz .................... B62D 25/025 |
| 2018/0370577 A1* | 12/2018 | Takahashi .......... B62D 25/2018 |
| 2019/0009832 A1* | 1/2019 | Kageyama ............. B62D 25/20 |
| 2019/0009834 A1* | 1/2019 | Kageyama ............. B60N 2/015 |
| 2019/0144038 A1* | 5/2019 | Takahashi .......... B62D 25/2027 296/193.07 |
| 2019/0382054 A1* | 12/2019 | Natsume ............... B62D 25/025 |
| 2020/0031399 A1* | 1/2020 | Matsuda ................ B62D 25/20 |
| 2020/0047818 A1* | 2/2020 | Ebisumoto ............ B62D 25/20 |
| 2020/0062311 A1* | 2/2020 | Kawase ............... B62D 29/008 |
| 2020/0130748 A1* | 4/2020 | Dominic ................ B62D 25/04 |
| 2020/0180698 A1* | 6/2020 | Lee ........................ B62D 25/20 |
| 2020/0189665 A1* | 6/2020 | Friedman ............. B62D 29/001 |

FOREIGN PATENT DOCUMENTS

| | | |
|---|---|---|
| DE | 102005036900 A1 | 2/2007 |
| DE | 102009053396 A1 | 6/2010 |
| EP | 1762465 A1 | 3/2007 |
| EP | 2487090 A2 | 8/2012 |
| JP | H07277227 A | 10/1995 |
| JP | 2013194249 A | 9/2013 |
| RU | 2481218 C1 | 5/2013 |
| RU | 2536008 C2 | 12/2014 |
| WO | WO2012063393 A | 5/2012 |
| WO | WO2013121963 A1 | 8/2013 |

OTHER PUBLICATIONS

The International Search Report issued in connection with International Application No. PCT/IB2015/059485 dated Aug. 31, 2016.
English Abstract of DE102009053396, Jun. 17, 2010.
English Abstract of EP2487090, Aug. 15, 2012.

* cited by examiner

VEHICLE UNDERBODY STRUCTURE COMPRISING A TRANSVERSAL BEAM OF VARYING RESISTANCE TO PLASTIC DEFORMATION

FIELD OF THE INVENTION

The present invention relates to a vehicle underbody structure, comprising a floor panel, at least one longitudinal beam extending in a longitudinal direction of the vehicle under said floor panel and at least one transversal beam extending in a transversal direction, substantially perpendicular to the longitudinal direction, above the floor panel, the floor panel extending transversally between two sides, the transversal beam comprising a transversal central end extending under a central area of said floor panel and a transversal side end extending at one of the sides of said floor panel.

BACKGROUND OF THE INVENTION

Conventionally, the underbody structure of a vehicle forming the floor of the vehicle is arranged to protect the vehicle occupants in case of an impact, in particular a side impact or a front impact by limiting intrusions of any kind in the vehicle passenger compartment.

To this end, the underbody structure comprises reinforcement elements arranged transversally between structural longitudinal elements, such as underfloor longitudinal beams. This assembly is arranged to prevent the deformation of the vehicle compartment to maintain the integrity of the floor panel in case of an impact, thereby protecting the occupants of the vehicle.

While this arrangement can be efficient to preserve the integrity of the passenger compartment during an impact, such an underbody structure is not efficient to absorb the energy due to the impact, which is then integrally transmitted to the passenger compartment. Such a transmission can be dangerous for the passengers of the vehicle.

BRIEF SUMMARY OF THE INVENTION

One of the objects of the invention is to improve the behavior of the vehicle underbody structure in case of an impact.

The invention provides a vehicle underbody structure of the afore-mentioned type, wherein the transversal beam comprising a central portion, extending between the central end and an intermediate part of the transversal beam, and an end portion, extending between the intermediate part and the side end, the resistance to plastic deformation of the central portion being greater than the resistance to plastic deformation of the end portion, and the intermediate part of the transversal beam extends upright of the longitudinal beam such that the end portion of the transversal beam extends transversally between the longitudinal beam and one of the sides of the floor panel.

By providing a side end of the transverse beam having a lower resistance to plastic deformation, the transversal beam is able to absorb energy in case of an impact against the side of the floor panel. By having a greater resistance to plastic deformation at the central end of the transversal beam, the deformation of the passenger compartment can be prevented in case of an impact. Consequently, the transversal beam according to the invention is both adapted to absorb energy where the impact occurs and to preserve the passenger compartment from any intrusion due to the impact.

According to other advantageous aspects of the invention, the vehicle underbody structure comprises one or more of the following features, considered alone or according to any technically possible combination:

the tensile strength of the material of the central portion is greater than the tensile strength of the material of the end portion;

the tensile strength of the material of the central portion is greater than 1300 MPa and the tensile strength of the end portion is greater than or equal to 450 MPa and inferior to 1300 MPa;

the composition of the material of the central portion comprises in % weight:
  $0.15\% \leq C \leq 0.5\%$, $0.5\% \leq Mn \leq 3\%$, $0.1\% \leq Si \leq 1\%$, $0.005\% \leq Cr \leq 1\%$, $Ti \leq 0.2\%$, $Al \leq 0.1\%$, $S \leq 0.05\%$, $P \leq 0.1\%$, $B \leq 0.010\%$, the remainder being iron and unavoidable impurities resulting from the elaboration,
  or
  $0.20\% \leq C \leq 0.25\%$, $1.1\% \leq Mn \leq 1.4\%$, $0.15\% \leq Si \leq 0.35\%$, $\leq Cr \leq 0.30\%$, $0.020\% \leq Ti \leq 0.060\%$, $0.020\% \leq Al \leq 0.060\%$, $S \leq 0.005\%$, $P \leq 0.025\%$, $0.002\% \leq B \leq 0.004\%$, the remainder being iron and unavoidable impurities resulting from the elaboration;
  or
  $0.24\% \leq C \leq 0.38\%$, $0.40\% \leq Mn \leq 3\%$, $0.10\% \leq Si \leq 0.70\%$, $0.015\% \leq Al \leq 0.070\%$, $Cr \leq 2\%$, $0.25\% \leq Ni \leq 2\%$, $0.015\% \leq Ti \leq 0.10\%$, $Nb \leq 0.060\%$, $0.0005\% \leq B \leq 0.0040\%$, $0.003\% \leq N \leq 0.010\%$, $S \leq 0005\%$, $P \leq 0025\%$, the remainder being iron and unavoidable impurities resulting from the elaboration; and wherein the composition of the material of the end portion (40) comprises, in % weight: $0.04\% \leq C \leq 0.1\%$, $0.3\% \leq Mn \leq 2\%$, $Si \leq 1.3\%$, $Ti \leq 0.08\%$, $0.015\% \leq Nb \leq 0.1\%$, $Al \leq 0.1\%$, $S \leq 0.05\%$, $P \leq 0.1\%$, Cu, Ni, Cr, Mo, less than 0.1%, the remainder being iron and unavoidable impurities resulting from the elaboration;

the length of the central portion in the transversal direction is greater than the length of the end portion in the transversal direction;

the vehicle underbody structure comprises a left transversal beam extending transversally between the central area and a left side of the floor panel and a right transversal beam extending transversally between the central area and a right side of the floor panel, the left transversal beam and the right transversal beam extending along the same transversal axis;

the central end of the left transversal beam and the central end of the right transversal beam are attached on either side of a tunnel beam;

the vehicle underbody structure comprises a left longitudinal beam and a right longitudinal beam extending longitudinally under the floor panel, the left transversal beam passing above the left longitudinal beam and the right transversal beam passing above the right longitudinal beam;

the vehicle underbody structure further comprises a left lowerside sill and a right lowerside sill, extending on either side of the floor panel, the left transversal beam extending between the central area of the floor panel and the left lowerside sill and the right transversal beam extending between the central area of the floor panel and the right lowerside sill;

the vehicle underbody structure comprises a front left transversal beam, a front right transversal beam, a rear left transversal beam and rear right transversal beam, the front left and front right transversal beams extending along the same front transversal axis and the rear left and rear right transversal beams extending along the same rear transversal axis, said front transversal axis and said rear transversal axis being spaced from each other according the longitudinal direction. The invention also relates to a vehicle body comprising a vehicle underbody structure as described above.

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE INVENTION

In the following description, the term "longitudinal" refers to the rear-front direction, and the term "transversal" refers to the left-right direction of an automotive vehicle in regular use condition. The terms "rear" and "front" are defined relative to the longitudinal direction, and the terms "upper" and "lower" are defined relative to the elevation direction of an automotive vehicle in regular use condition.

Figure 1:
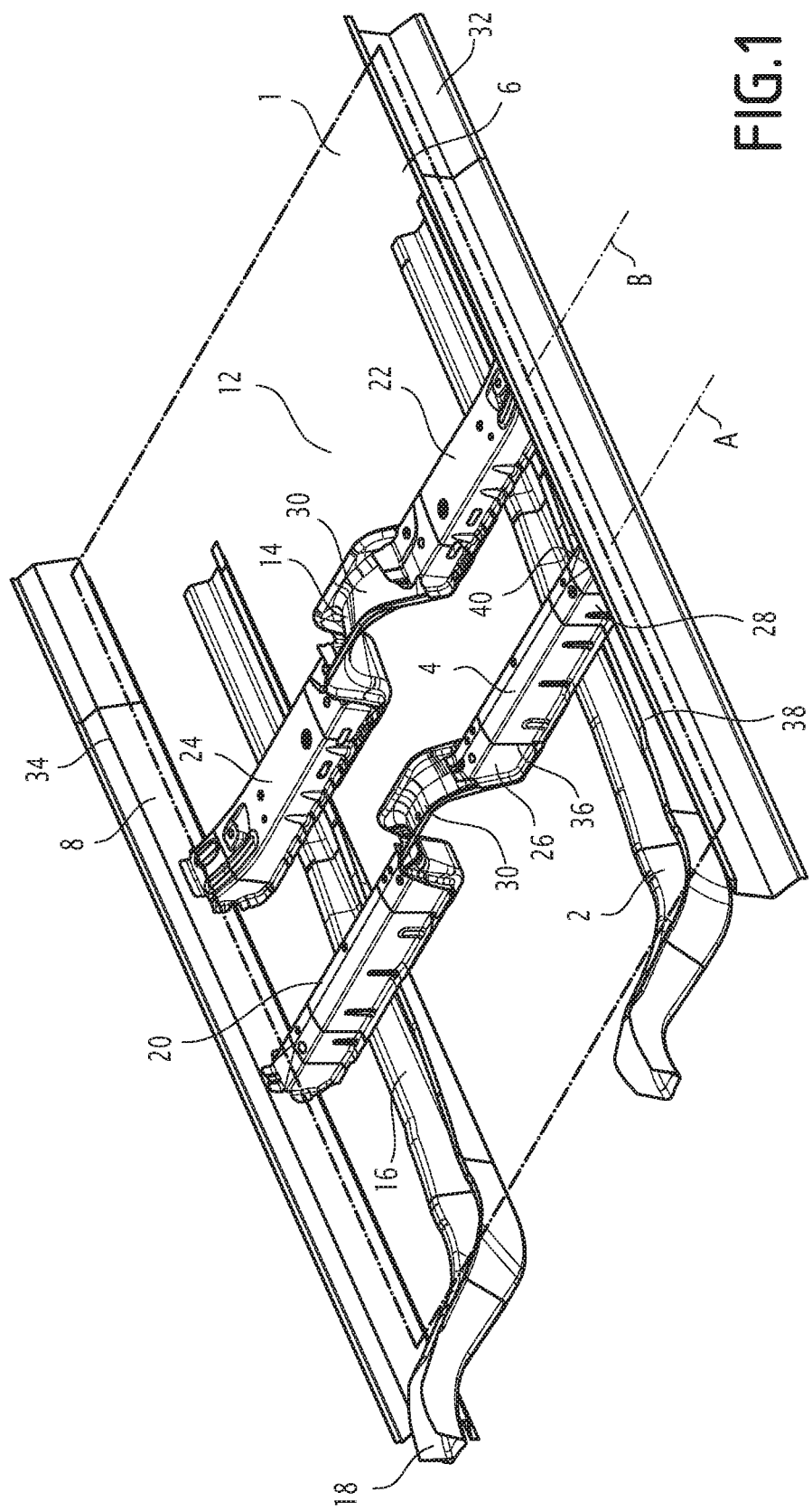
FIG. 1 is a perspective view of the vehicle underbody structure of the invention.
Figure 2:
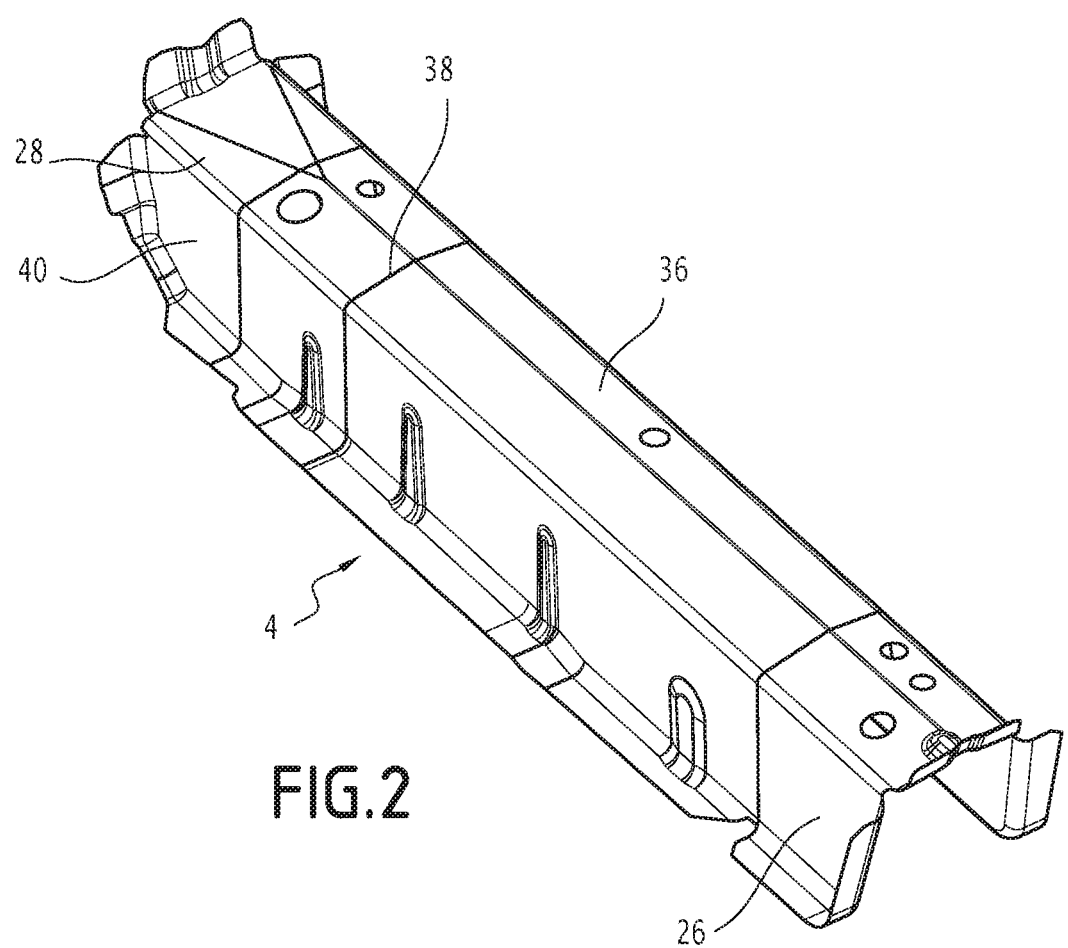
FIG. 2 is a perspective view of one of the transversal beams of the vehicle underbody structure of FIG. 1.

With reference to FIG. 1, there is described a vehicle underbody structure comprising a floor panel 1 (shown in dashed lines), at least one longitudinal beam 2 and at least one transversal beam 4.

The floor panel 1 extends generally along a horizontal plane in regular use condition of the vehicle and extends longitudinally between a front side 6 and a rear side and transversally between a left side 8 and a right side 10 (also called rockers or side members). A central area 12 of the floor panel 1 is defined as being the area extending around the center of the floor panel 1 at equal distance from the left side 6 and the right side 8. More particularly, the central area 12 is defined by the passage of the floor tunnel 14 which extends longitudinally at the center of the floor panel 1.

The underbody structure is substantially symmetrical relative to a plane comprising the longitudinal and elevation direction and passing by the center of the floor panel between the left side 6 and the right side 8. Consequently, the following description will be made in detail for the left side only, the same teachings applying for the right side.

The floor panel 1 is intended to form the floor of the automotive vehicle and to serve as a base structure for the seats and the other elements of the passenger compartments.

The longitudinal beam 2 extends below the floor panel 1. According to the embodiment shown in FIG. 1, the underbody structure comprises a left longitudinal beam 2 extending in the vicinity of and parallel to the left side 6 of the floor panel 1 and a right longitudinal beam 16 extending in the vicinity of and parallel to the right side 8 of the floor panel.

Each longitudinal beam 2, 16 (also called underbody rails) extends in the longitudinal direction substantially under the whole length of the floor panel 1, i.e. from the rear side to the front side, and comprises a longitudinal front end 18 extending past the front side of the floor panel, as shown in FIG. 1. As known, the longitudinal beams 2, 16 are part of the structure for protecting the passengers of the vehicle in case of a frontal impact by being attached, at its front end 16 to the transversal bumper beam via impact absorbing elements, such as crash boxes and front rails. As shown in FIG. 1, each longitudinal beam has for example a U-shaped cross section in a transversal plane, the U opening towards the floor panel 1 of the vehicle and closed by the floor panel.

The function of such longitudinal beams is known per se and will not be described in detail here. The longitudinal beam 2 is or example made of a press hardened steel part having a tensile strength greater than 1200 MPa.

The composition of such steel may comprise for example, in % weight: 0.15%≤C≤0.5%, 0.5%≤Mn≤3%, 0.1%≤Si≤1%, 0.005%≤Cr≤1%, Ti≤0.2%, Al≤0.1%, S≤0.05%, P≤0.1%, B≤0.010%, the remainder being iron and unavoidable impurities resulting from the elaboration.

According another preferred embodiment, the steel composition comprises for example, in % weight: 0.20%≤C≤0.25%, 1.1%≤Mn≤1.4%, 0.15%≤Si≤0.35%, ≤Cr≤0.30%, 0.020%≤Ti≤0.060%, 0.020%≤Al≤0.060%, S≤0.005%, P≤0.025%, 0.002%≤B≤0.004%, the remainder being iron and unavoidable impurities resulting from the elaboration. With this composition range, the tensile strength of the press hardened part is comprised between 1300 and 1650 MPa.

According another preferred embodiment, the steel composition comprises for example, in % weight: 0.24%≤C≤0.38%, 0.40%≤Mn≤3%, 0.10%≤Si≤0.70%, 0.015%≤Al≤0.070%, Cr≤2%, 0.25%≤Ni≤2%, 0.015%≤Ti≤0.10%, Nb≤0.060%, 0.0005%≤B≤0.0040%, 0.003%≤N≤0.010%, S≤0.005%, P≤0.025%, %, the remainder being iron and unavoidable impurities resulting from the elaboration. With this composition range, the tensile strength of the press hardened part is higher than 1800 MPa.

Such a steel has very high mechanical characteristics, which makes it suitable for forming the longitudinal beams since said beams extends under the passenger compartment and participate to the underformability of the passenger compartment.

The transversal beam 4 extends above the floor panel 1 in the transversal direction between the central area 12 and one of the sides of the floor panel 1.

According to the embodiment shown in FIG. 1, the underbody structure comprises a front left transversal beam 4 extending between the central area 12 and the left side 6 of the floor panel, a front right transversal beam 20 extending between the central area 12 and the right side 8 of the floor panel, a rear left transversal beam 22 extending between the central area 12 and the left side 6 of the floor panel and a rear right transversal beam 24 extending between the central area 12 and the right side 8 of the floor panel. The front left and right transversal beams 4, 20 extend along a same front transversal axis A on either side of the floor tunnel 14 and the rear left and right transversal beams 22, 24 extend along a same rear transversal axis B on either side of the floor tunnel 14, the front transversal axis A and the rear transversal axis B being spaced along the longitudinal direction. Such transversal beams 4, 20, 22, 24 are the beams extending below the front seats of the vehicle.

Each transversal beam 4, 20, 22, 24 extends between a transversal central end 26, extending toward the central area 12 of the floor panel, and a transversal side end 28, extending toward one of the side of the floor panel. More particularly, the central end 26 is attached to a tunnel beam 30 passing over the floor tunnel 14 and the side end 28 is attached to a lowerside rail 32, 34 extending in the longitudinal direction outboard of a side of the floor panel, i.e, along one side of the floor panel but outside of said floor panel 1. The side ends 28 of the front and rear left transversal beams 4, 22 are attached to a left lowerside sill 32 adjacent to the left side 6 of the floor panel and the side ends 28 of the front and rear right transversal beams 20, 2 are attached to a right lowerside sill 34 adjacent to the right side 8 of the floor panel.

According to the invention, the resistance to plastic deformation of each transversal beam 4, 20, 22, 24 at the central end 26 is greater than the resistance to plastic deformation of each transversal beam 4, 20, 22, 24 at the side end 28, as will be described subsequently.

Each transversal beam 4, 20, 22, 24 comprises a central portion 36 extending between the central end 26 and an intermediate part 38 of the transversal beam and an end portion 40 extending between the intermediate part 38 and the side end 28. The intermediate part of the transversal beam is defined as the part extending upright of the longitudinal beam 2, 16 over which the transversal beam extends. For example, the intermediate part of the front left transversal beam extends upright of the left longitudinal beam 2. Consequently, the end portion 40 of each transversal beam extends transversally between one of the longitudinal beam and the side of floor panel adjacent to said longitudinal beam.

The central portion 36 has a resistance to plastic deformation which is greater than the resistance to plastic deformation of the end portion 40, meaning that the part of the transversal beam extending between the central area and a longitudinal beam has a greater resistance to plastic deformation than the part of the transversal beam extending between the longitudinal beam and the adjacent lowerside sill. This can be achieved by providing a central portion 36 having a greater tensile strength than the tensile strength of the end portion 40. For example, the tensile strength of the central portion 36 is greater than 1300 MPa and the tensile strength of the end portion is greater than or equal to 450 MPa and inferior to 1300 Mpa. To this end, the central portion 36 is for example made of a press hardened steel having a tensile strength greater than 1300 MPa while the end portion 40 is for example made of a press hardened steel having a tensile strength greater than 450 MPa and inferior to 800 MPa.

According to an embodiment, the central portion is made of a press hardened steel part having a composition comprising for example, in % weight: $0.15\% \leq C \leq 0.5\%$, $0.5\% \leq Mn \leq 3\%$, $0.1\% \leq Si \leq 1\%$, $0.005\% \leq Cr \leq 1\%$, $Ti \leq 0.2\%$, $Al \leq 0.1\%$, $S \leq 0.05\%$, $P \leq 0.1\%$, $B \leq 0.010\%$, the remainder being iron and unavoidable impurities resulting from the elaboration.

According to another preferred embodiment, the steel composition comprises for example, in % weight: $0.20\% \leq C \leq 0.25\%$, $1.1\% \leq Mn \leq 1.4\%$, $0.15\% \leq Si \leq 0.35\%$, $\leq Cr \leq 0.30\%$, $0.020\% \leq Ti \leq 0.060\%$, $0.020\% \leq Al \leq 0.060\%$, $S \leq 0.005\%$, $P \leq 0.025\%$, $0.002\% \leq B \leq 0.004\%$, the remainder being iron and unavoidable impurities resulting from the elaboration. With this composition range, the tensile strength of the press hardened part is comprised between 1300 and 1650 MPa.

According to another preferred embodiment, the steel composition comprises for example, in % weight: $0.24\% \leq C \leq 0.38\%$, $0.40\% \leq Mn \leq 3\%$, $0.10\% \leq Si \leq 0.70\%$, $0.015\% \leq Al \leq 0.070\%$, $Cr \leq 2\%$, $0.25\% \leq Ni \leq 2\%$, $0.015\% \leq Ti \leq 0.10\%$, $Nb \leq 0.060\%$, $0.0005\% \leq B \leq 0.0040\%$, $0.003\% \leq N \leq 0.010\%$, $S \leq 0.005\%$, $P \leq 0.025\%$, the remainder being iron and unavoidable impurities resulting from the elaboration. With this composition range, the tensile strength of the press hardened part is higher than 1800 MPa.

According to an embodiment, the end portion 40 is a press hardened steel part having a composition comprising, in % weight: $0.04\% \leq C \leq 0.1\%$, $0.3\% \leq Mn \leq 2\%$, $Si \leq 1.3\%$, $Ti \leq 0.08\%$, $0.015\% \leq Nb \leq 1.1\%$, $Al \leq 0.1\%$, $S \leq 0.05\%$, $P \leq 0.1\%$, Cu, Ni, Cr, Mo, less than 0.1%, the remainder being iron and unavoidable impurities resulting from the elaboration. With this composition range, the tensile strength of the press hardened part end portion is comprised between 450 and 800 MPa.

The end portion 36 of each transversal beam has a bending angle greater than 75°, preferably greater than 80°, which confers good ductility properties to the end portion. The bending angle is determined on press hardened parts of 60×60 mm² supported by two rollers, according to VDA-238 bending Standard. The bending effort is exerted by a 0.4 mm radius sharp punch. The spacing between the rollers and the punch is equal to the thickness of the tested parts, a clearance of 0.5 mm being added. The crack apparition is detected since it coincides with a load decrease in the load-displacement curve. Tests are interrupted when the load decreases more than 30N of its maximal value. The bending angle (a) of each sample is measured after unloading and thus after specimen spring-back. Five samples along each direction (rolling direction and transverse direction) are bent so to obtain an average value aA of the bending angle.

The thickness of the central portion 36 and of the end portion 40 can also be adapted to adapt the resistance to plastic deformation of the said portions. For example, the thickness of the central portion 36 is greater than the thickness of the end portion 40. The thickness of the central portion 36 is for example comprised between 08 to 1.6 mm and the thickness of the end portion 40 is for example comprised between 08 to 2 mm.

Each transversal beam can be obtained by attaching a planar flank corresponding to the central portion and a planar flank corresponding to the end portion together and by shaping the transversal beam, for example by hot stamping. The flanks can be attached together by laser welding. The transversal beam has for example a U-shape opened towards the floor panel 1.

The length of the central portion 36, measured along the transversal direction, is greater than the length of the end portion 40. For example the length of the end portion 40 is comprised between 5 and 25% of the length of the central portion 36.

The above-described transversal beams 4, 20, 22, 24 are attached by their central end 26 to a tunnel beam 30 and by the side end 28 to a lowerside sill 32, 34 to form the underbody structure.

The above-described underbody structure is particularly advantageous in case of an impact, more particularly in case of a side impact. In this case, the side ends 28, and side portions 40, of the transversal beams 4, 20, 22, 24 present a ductility which makes them able to be plastically deformed, thereby absorbing energy due to the impact, while the central ends 26, and central portion 36, have a mechanical resistance to plastic deformation which makes them able to remain undeformed during the impact and therefore protect the integrity of the passenger compartment.

Consequently, the space extending from the central area to the longitudinal beams, corresponding to the receiving space of the passengers of the vehicle, is particularly well protected against any kind of intrusion in case of an impact while the space extending outboard of the longitudinal beams is arranged to absorb the energy due to the impact such that the amount of energy transmitted to the passenger compartment is reduced.

The invention has been described in conjunction with transversal beams having a central portion with a greater resistance to plastic deformation than the end portion. However, the transversal beams could also comprise more than two portions of decreasing resistance to plastic deformation from the central area of the sides of the floor panel 1 such that the central end of the transversal beam has a greater resistance than the side end of the transversal beam. The invention could also be implemented with an end portion having a gradient of resistance to plastic deformation such that said plastic deformation decreases from the intermediate part 38 to the side end 28 of the end portion.

The invention claimed is:

1. A vehicle underbody structure, comprising a floor panel, at least one longitudinal beam extending in a longitudinal direction of the vehicle under said floor panel and at least one transversal beam extending in a transversal direction, perpendicular to the longitudinal direction, above the floor panel, the floor panel extending transversally between two sides, the transversal beam comprising a transversal central end extending toward a central area of said floor panel and a transversal side end extending at one of the sides of said floor panel, wherein the transversal beam comprises a central portion, extending between the central end and an intermediate part of the transversal beam, and an end portion, extending between the intermediate part and the side end, the resistance to plastic deformation of the central portion being greater than the resistance to plastic deformation of the end portion, and in that the intermediate part of the transversal beam extends upright of the longitudinal beam such that the end portion of the transversal beam extends transversally between the longitudinal beam and one of the sides of the floor panel.

2. The vehicle underbody structure according to claim 1, wherein the tensile strength of the material of the central portion is greater than the tensile strength of the material of the end portion.

3. The vehicle underbody structure according to claim 2, wherein the tensile strength of the material of the central portion is greater than 1300 MPa and the tensile strength of the end portion is greater than or equal to 450 MPa and inferior to 1300 MPa.

4. The vehicle underbody structure according to claim 2, wherein the composition of the material of the central portion comprises in % weight:
0.15%<C<0.5%, 0.5%<Mn<3%, 0.1%<Si<1%, 0.005%<Cr<1%, Ti<0.2%, Al<0.1%, S<0.05%, P<0.1%, B<0.010%, the remainder being iron and unavoidable impurities resulting from the elaboration, or
0.20%<C<0.25%, 1.1%<Mn<1.4%, 0.15%<Si<0.35%, <Cr<0.30%, 0.020%<Ti<0.060%, 0.020%<Al<0.060%, S<0.005%, P<0.025%, 0.002%<B<0.004%, the remainder being iron and unavoidable impurities resulting from the elaboration; or
0.24%<C<0.38%, 0.40%<Mn<3%, 0.10%<Si<0.70%, 0.015%<Al<0.070%, Cr<2%, 0.25%<Ni<2%, 0.015%<Ti<0.10%, Nb<0.060%, 0.0005%<B<0.0040%, 0.003%<N<0.010%, S<0,005%, P<0,025%, the remainder being iron and unavoidable impurities resulting from the elaboration; and
wherein the composition of the material of the end portion comprises, in % weight: 0.04%<C<0.1%, 0.3%<Mn<2%, Si<0.3%, Ti<0.08%, 0.015%<Nb<0.1%, Al<0.1%, S <0.05%, P<0.1%, Cu, Ni, Cr, Mo, less than 0.1%, the remainder being iron and unavoidable impurities resulting from the elaboration.

5. The vehicle underbody structure according to claim 1, wherein the length of the central portion in the transversal direction is greater than the length of the end portion in the transversal direction.

6. The vehicle underbody structure according to claim 1, wherein the at least one transversal beam comprises a left transversal beam extending transversally between the central area and a left side of the floor panel and a right transversal beam extending transversally between the central area and a right side of the floor panel, the left transversal beam and the right transversal beam extending along the same transversal axis.

7. The vehicle underbody structure according to claim 6, wherein the central end of the left transversal beam and the central end of the right transversal beam are attached on either side of a tunnel beam.

8. The vehicle underbody structure according to claim 6, wherein the at least one longitudinal beam comprises a left longitudinal beam and a right longitudinal beam extending longitudinally under the floor panel, the left transversal beam passing above the left longitudinal beam and the right transversal beam passing above the right longitudinal beam.

9. The vehicle underbody structure according to claim 6, further comprising a left lowerside sill and a right lowerside sill, extending on either side of the floor panel, the left transversal beam extending between the central area of the floor panel and the left lowerside sill and the right transversal beam extending between the central area of the floor panel and the right lowerside sill.

10. The vehicle underbody structure according to claim 6, wherein the at least one transversal beam comprises a front left transversal beam, a front right transversal beam, a rear left transversal beam and rear right transversal beam, the front left and front right transversal beams extending along the same front transversal axis and the rear left and rear right transversal beams extending along the same rear transversal axis, said front transversal axis and said rear transversal axis being spaced from each other according the longitudinal direction.

11. A vehicle body comprising a vehicle underbody structure according to claim 1.

\* \* \* \* \*